(12) United States Patent
Carvalho et al.

(10) Patent No.: US 10,683,221 B2
(45) Date of Patent: Jun. 16, 2020

(54) GAS INJECTION AND RECYCLING APPARATUS AND METHODS

(71) Applicants: L'Air Liquide, Société Anonyme pour l'Etude et l'Exploitation des Procédés Georges Claude, Paris (FR); American Air Liquide, Inc., Fremont, CA (US)

(72) Inventors: Milson Carvalho, São Paolo (BR); Maicon Neryz, Santo André (BR); Ivan Pajolli, São Paolo (BR); Joerg Schwerdt, Kaarst (DE); Vasuhi Rasanayagam, Newark, DE (US); Chunqiong Shi, Shanghai (CN)

(73) Assignees: L'Air Liquide, Société Anonyme pour l'Etude et l'Exploitation des Procédés Georges Claude, Paris (FR); American Air Liquide, Inc., Fremont, CA (US)

( * ) Notice: Subject to any disclaimer, the term of this patent is extended or adjusted under 35 U.S.C. 154(b) by 0 days.

(21) Appl. No.: 16/210,914

(22) Filed: Dec. 5, 2018

(65) Prior Publication Data

US 2019/0185353 A1  Jun. 20, 2019

Related U.S. Application Data

(60) Provisional application No. 62/598,842, filed on Dec. 14, 2017.

(51) Int. Cl.
*C02F 3/26* (2006.01)
*C02F 3/20* (2006.01)
(Continued)

(52) U.S. Cl.
CPC .............. *C02F 3/26* (2013.01); *B01F 3/0478* (2013.01); *B01F 3/04539* (2013.01); *C02F 3/16* (2013.01);
(Continued)

(58) Field of Classification Search
CPC .... C02F 3/26; C02F 3/16; C02F 3/207; B01F 3/04539; B01F 3/0478; B01F 2003/0468;
(Continued)

(56) References Cited

U.S. PATENT DOCUMENTS 3,810,548 A * 5/1974 Blough ............... B01F 3/04539
                                          210/242.2
4,086,306 A * 4/1978 Yoshinaga ........... A01K 63/047
                                          210/219
(Continued)

*Primary Examiner* — Fred Prince
(74) *Attorney, Agent, or Firm* — Yan Jiang

(57) ABSTRACT

A device and method for injection of oxygen-rich gas into a body of liquid with oxygen recycling are disclosed. The device comprises a rotary hollow shaft vertically passing through a float partially immersed in the liquid, an impeller attached to the lower end of the rotary hollow shaft, a columnar structure, surrounding the rotary hollow shaft, mounted on the bottom side of the float and vertically extending into the liquid, a gas diffusion chamber formed by the columnar structure, the float and the liquid surface under the float, and a gas injection conduit passing through the float for delivering the oxygen gas into the gas diffusion chamber, wherein a vacuum is generated in the body of the liquid around the impeller when the impeller is driven to rotate, so that the oxygen-rich gas in the gas diffusion chamber is sucked into the body of the liquid and mixed therein.

20 Claims, 3 Drawing Sheets

(51) Int. Cl.
*C02F 3/16* (2006.01)
*B01F 3/04* (2006.01)

(52) U.S. Cl.
CPC ...... *C02F 3/207* (2013.01); *B01F 2003/0468* (2013.01); *B01F 2003/04546* (2013.01); *B01F 2003/04631* (2013.01); *B01F 2003/04645* (2013.01); *B01F 2215/0052* (2013.01)

(58) Field of Classification Search
CPC .. B01F 2003/04645; B01F 2003/04631; B01F 2003/04546; B01F 2215/0052
USPC ....... 210/604, 605, 620, 630, 747.6, 170.05, 210/220, 221.1, 221.2, 242.2
See application file for complete search history.

(56) References Cited

U.S. PATENT DOCUMENTS

| | | | |
|---|---|---|---|
| 4,089,620 A * | 5/1978 | Ravitts | F04D 13/066 210/242.2 |
| 5,534,141 A * | 7/1996 | McAnaney | B01D 21/0027 210/110 |
| 6,135,430 A | 10/2000 | Bergman, Jr. et al. | |
| 6,145,815 A | 11/2000 | Cheng et al. | |
| 6,270,061 B1 | 8/2001 | Bouquet et al. | |
| 6,270,681 B1 | 8/2001 | Gray | |
| 6,582,612 B1 * | 6/2003 | White | A01K 63/04 210/747.6 |
| 6,787,036 B2 | 9/2004 | Long | |
| 7,335,304 B2 | 2/2008 | Campo et al. | |
| 7,404,924 B2 * | 7/2008 | Letelier | C22B 1/00 266/169 |
| 7,431,272 B2 | 10/2008 | Melen et al. | |
| 7,455,776 B2 | 11/2008 | Fabiyi et al. | |
| 7,497,949 B2 | 3/2009 | Fabiyi et al. | |
| 7,661,658 B2 * | 2/2010 | Sun | B01F 3/04539 210/242.2 |
| 8,597,514 B2 * | 12/2013 | Bradley | B01F 3/04609 210/150 |
| 9,486,750 B2 | 11/2016 | Fabiyi et al. | |
| 9,656,218 B2 | 5/2017 | Fabiyi et al. | |
| 2005/0061721 A1 * | 3/2005 | Tormaschy | B01F 3/04609 210/121 |
| 2006/0151897 A1 | 7/2006 | Melen et al. | |
| 2006/0255482 A1 | 11/2006 | Chevalier et al. | |
| 2008/0143000 A1 * | 6/2008 | Sun | B01F 3/04539 261/30 |
| 2013/0140246 A1 | 6/2013 | Fabiyi | |
| 2015/0101993 A1 | 4/2015 | Fabiyi et al. | |

* cited by examiner

GAS INJECTION AND RECYCLING APPARATUS AND METHODS

CROSS REFERENCE TO RELATED APPLICATIONS

This application claims the benefit of priority under 35 U.S.C. § 119 (a) and (b) to U.S. Provisional Patent Application No. 62/598,842, filed Dec. 14, 2017, the entire contents of which are incorporated herein by reference.

FIELD OF THE INVENTION

The invention pertains to apparatus and methods for enhancing mass transfer in aeration and oxygenation system, in particular, for injecting oxygen gas or oxygen-rich gas into the wastewater with oxygen recycling.

BACKGROUND

Wastewater is water that has been used. The wastewater usually contains various pollutants, depending on what it was used for, that can result in environmental pollution. In order to protect the environment and promote public health, wastewater treatment is required. Wastewater treatment methods are broadly classifiable into physical, chemical and biological processes.

There are many biological processes for treatment of wastewaters, for example activated sludge, trickling filters, rotating biological contactors and bio-filters. Many are aerobic wastewater treatment processes and have in common the use of oxygen (or air) and microbial action to biotreat the pollutants in wastewaters. Equipment may include diffused aeration systems or surface-aerated systems in order to maximize oxygen transfer and minimize odors as the wastewater is treated. Aeration is one of the first stages in the process since bacteria and other organisms require oxygen to aerobically break down organic substances in the wastewater being treated. In a surface-aerated system or floating surface aerator, the aerator transfers the air or oxygen required by the biological oxidation reactions into the wastewater liquid, and provides the mixing required for dispersing the air or oxygen and for contacting the reactants (that is, oxygen, wastewater and microbes). Typically, the floating surface aerators are rated to deliver the amount of air equivalent to 1.8 to 2.7 kg $O_2$/kWh. However, they do not provide as good mixing as is normally achieved in activated sludge systems and therefore aerated wastewater liquid do not achieve the same performance level as activated sludge units. An activated sludge process refers to a multi-chamber reactor unit that makes use of highly concentrated microorganisms to degrade organics and remove nutrients from wastewater to produce a high-quality effluent. To maintain aerobic conditions and to keep the activated sludge suspended, a continuous and well-timed supply of oxygen is required. Activated sludge consists of flocs of bacteria, which are suspended and mixed with wastewater in an aerated tank. The bacteria use the organic pollutants to grow and transform it to energy, water, $CO_2$ and new cell material. Activated sludge systems are suspended-growth type and are used in conventional high-tech wastewater treatment plants to treat almost every wastewater influent as long as it is biodegradable.

For instance, a wastewater treatment system is disclosed in U.S. patent publication No. 2015/0101993. The device is placed in an aeration basin containing a surfactant laden wastewater, in which a helical impeller connected to a motor rotates within a submerged draft tube. Oxygen gas is introduced into the draft tube through a gas inlet which discharges the oxygen gas via a sintered metal disk, ceramic membrane or polymeric ultrafine pore diffuser ring to deliver very fine bubbles of high purity oxygen directly into the surfactant laden wastewater. During operation of the device, a recirculation loop below the surface of the surfactant laden wastewater is created for undissolved gas bubbles that are discharged from the exit of the draft tube and recaptured into the inlet opening of the draft tube. In order to achieve a reliable capture and recovery of undissolved gases without a collection hood or containment surface, a higher relative value of superficial liquid velocity in the draft tube to the terminal bubble rise velocity is maintained, which is controlled by the rotation speed of the helical impeller. In this manner, small bubble sizes of injected oxygen are controlled to obtain a uniform, terminal ascent velocity less than the superficial velocity of the liquid and allow a substantial portion of the gas to be recaptured for recirculation back into the draft tube. Thus, the operation of this device relies on the control of the ascent velocity of the oxygen bubbles and the superficial velocity of the liquid. This requires attention on the oxygen bubble size and the speed of the impeller, which is complicated and not easy to control.

Other systems and methods for oxygenating for wastewater treatments have developed, for instance, U.S. Pat. Nos. 6,135,430, 6,145,815, 9,656,218, 9,486,750, 7,455,776 and 7,497,949. However, they lack of oxygen recovery.

Undissolved gas normally escapes the liquid or wastewater which is a waste. A system for treating an aeration pond with oxygen recycling is disclosed in U.S. Pat. No. 6,270,681. The system treats water with substantially pure oxygen, in which the pure oxygen originates from a pressurized oxygen supply and is conducted through a conduit to the bottom of the pond and a hood disposed to float above the surface of the pond collects Undissolved oxygen that flows back to the conduit of the pure oxygen, where the undissolved oxygen mixes with fresh pure oxygen from the pressurized source, and is recycled through the pond.

There is, therefore, a need to develop novel floating surface aerator devices for use in biotreatment of the pollutants in wastewater treatment plants, which may provide high efficiency of wastewater treatment with oxygen recycling.

SUMMARY

There is disclosed a device for injection of oxygen gas or oxygen-rich gas into a body of liquid or wastewater. The disclosed device comprises: a rotary hollow shaft vertically passing through a float, partially immersed in the liquid, an impeller attached to the lower end of the rotary hollow shaft, drivable by the rotary hollow shaft and immersed in the liquid, the impeller having a through hole fluidly connected to the rotary hollow shaft, when the impeller is driven to rotate, a vacuum generated in the rotary hollow shaft, the through hole and the body of the liquid around the impeller, a columnar structure, surrounding the rotary hollow shaft, mounted on the bottom side of the float and vertically extending into the liquid, a gas diffusion induction chamber formed by the columnar structure, the float and the liquid surface under the float, and a gas inlet passing through the float for delivering the oxygen gas into the gas diffusion chamber, wherein upon the vacuum generated the oxygen gas in the gas diffusion induction chamber is sucked into the body of the liquid through the rotary hollow shaft and the through hole of the impeller, where the oxygen gas is mixed and reacted with the liquid and undissolved oxygen gas rises up and is collected in the gas diffusion induction chamber for reuse.

There is disclosed a method for injection of oxygen gas or oxygen-rich gas into a body of liquid or wastewater using a floating aerator, the floating aerator including: a rotary hollow shaft vertically passing through a float, partially immersed in the liquid; an impeller attached to the lower end of the rotary hollow shaft, drivable by the rotary hollow shaft and immersed in the liquid, the impeller having a through hole fluidly connected to the rotary hollow shaft; a columnar structure, surrounding the rotary hollow shaft, mounted on the bottom side of the float and vertically extending into the liquid; and a gas inlet passing through the float surrounded by the columnar structure for delivering the oxygen gas, the method comprising the steps of: disposing the floating aerator on the liquid surface to form a gas diffusion induction chamber enclosed by the columnar structure, the float and the liquid surface under the float; delivering the oxygen gas into the gas diffusion induction chamber from the gas inlet; and driving the impeller to rotate and generate a vacuum in the rotary hollow shaft, the through hole and the body of the liquid around the impeller, wherein the oxygen gas in the gas diffusion induction chamber is sucked into the body of the liquid through the rotary hollow shaft and the through hole of the impeller, where the oxygen gas is mixed and reacted with the liquid and nonreacted oxygen gas rises up and is collected in the gas diffusion induction chamber for reuse.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Disclosed device will now be described in more details with reference to the appended FIGS. 1, 2 and 3, which represent the schematic diagram of an embodiment of a floating surface aerator device or a floating aerator device or an aerator or a mixer 100 for injection of a gas into a basin from its surface with gas recycling, and more particularly for injection of oxygen gas or oxygen-rich gas into a body of liquid or wastewater from its surface and collecting undissolved oxygen for reuse. The disclosed device is able to recycle undissolved oxygen gas or oxygen-rich gas injected into the liquid by using a gas diffusion induction chamber formed over the liquid surface, which increases the efficiency of utilizing the oxygen gas or oxygen-rich gas. In the floating aerator device, a special support is installed for separation of electrical components and oxygen gas conduit to isolate electrical components and oxygen injection.

Figure 1:
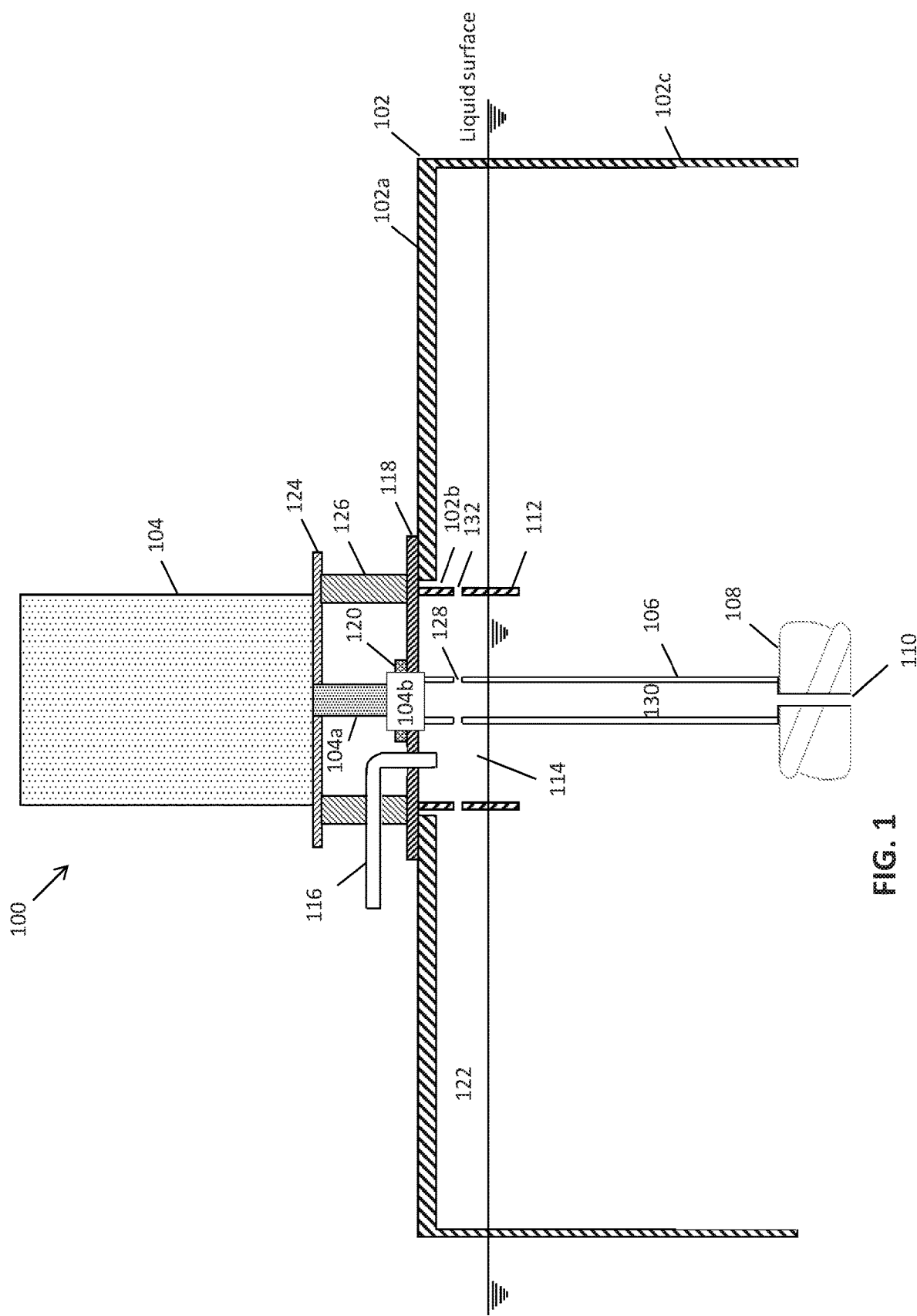
FIG. 1 is a schematic diagram of a vertical axial cross-sectional view of an embodiment of the disclosed floating aerator device.

More precisely, in the embodiment illustrated in FIG. 1, a device 100 is placed on a liquid surface of a body of the liquid. The device 100 may be a floating aerator device. The device 100 comprises a float 102, a drive device 104, a rotary hollow shaft 106 and an impeller 108. The rotary hollow shaft 106 vertically passes through the float 102 and is partially immersed in the liquid. The rotary hollow shaft 106 is driven to rotate by the drive device 104. The impeller 108 is attached to the lower end of the rotary hollow shaft 106, drivable by the rotary hollow shaft 106 and immersed in the liquid. The impeller 108 has a vertical gas jet hole 110 along the vertical axis of the impeller 108 fluidly connected to the rotary hollow shaft 106. When the impeller 108 is driven to rotate, a vacuum is generated in the rotary hollow shaft 106, the vertical gas jet hole 110 and the body of the liquid around the impeller 108. A columnar structure 112, surrounding the rotary hollow shaft 106, is mounted on the bottom side of the float 102 and vertically extends into the liquid. A gas diffusion induction chamber 114 is formed by the columnar structure 112, the float 102 and the liquid surface under the float 102. A gas inlet or gas injection conduit 116 passes through the float 102 for delivering the oxygen gas into the gas diffusion induction chamber 114. Upon the vacuum being generated, the oxygen gas in the gas diffusion induction chamber 114 is sucked into the body of the liquid through the rotary hollow shaft 106 and the vertical gas jet hole 110 of the impeller 108. The oxygen gas is dissolved and mixed with the liquid by the action of the rotating impeller 108, where it reacts with the waste components of the liquid and is consumed by aerobic bacteria. Undissolved or nonreacted oxygen gas rises up and is collected into the gas diffusion induction chamber 114 for reuse.

The float 102 has a top portion 102a floating above the liquid surface, a float opening 102b centered at the top portion 102a and an extended hood 102c connected to the outer rim of the top portion 102a and projecting away from the float top portion 102a to extend into the liquid. The float opening 102b is covered by a coupling flange 118 in which two through holes are formed, one for inserting the rotary hollow shaft 106, the other for inserting the gas injection conduit 116. The coupling flange 118 is fixed on the top portion 102a of the float 102 by bolting or other mechanical means with hydraulic seal (not shown). A hydraulic seal 120 is also applied to seal the rotary hollow shaft 106 with the coupling flange 118 and the gas injection conduit 116 (not shown) with the coupling flange 118 as well.

The float 102 comes in an upside down flower pot shape. The top portion 102a supports the components of the device 100 that are intended to be disposed above the liquid surface. The float 102 is made of fiber glass and is capable of floating on the liquid surface. One of ordinary skill in the art would recognize that the float 102 may be made of any existing or emerging material or floatation device providing sufficient buoyancy to be capable of floating the device 100 on the liquid surface. The shape of the top portion 102a viewed from its top may come in a circular shape as shown in FIG. 2. One of ordinary skill in the art would recognize the shape of the top portion 102a may come in a polygonal shape, such as, square, hexagonal, etc., as long as the device 100 is able to be maintained balanced on the liquid surface during operation.

The float opening 102b of the float 102 that facilities the rotary hollow shaft 106 and the gas injection conduit 116 by the coupling flange 118 may be formed in the center of the top portion 102a. One of ordinary skill in the art would recognize that the opening 102b may be located in any portion of the top portion 102a as long as the device 100 is able to be maintained balanced on the liquid surface during operation. The float opening 102b may be a cylindrical hole, or a polygonal columnar hole, such as, a square columnar hole, a hexagon columnar hole, etc.

The extended hood 102c is vertically extended and partially immersed in the liquid, thereby, forming a gas recovery room 122 between the top portion 102a of the float 102 and the liquid surface. The extended hood 102c prevents the undissolved oxygen (bubbles) from escaping from the sides of the device 100. The extended hood 102c may be vertically extended into the liquid from the outer rim of the top portion 102a (i.e. the top portion 102a of the float 102 versus the extended hood 102c is at a 90° angle). The extended hood 102c may be extended from the outer rim of the top portion 102a at other angles, such as any angle from 90° to less than 180° regarding the angle formed by the top portion 102a and the extended hood 102c according to the vertical axial cross-sectional view of FIG. 1, as long as the extended hood 102c is able to prevent the undissolved or released oxygen gas from escaping from the outside of the extended hood 102c. Preferably, the length of the extended hood 102c immersed in the liquid is approximately 80-120% of the length of the rotary hollow shaft 106 immersed in the liquid. More preferably, the length of the extended hood 102c immersed in the liquid is approximately the same as that of the rotary hollow shaft 106 immersed in the liquid. In this way, the extended hood 102c may be able to block almost all the undissolved oxygen (bubbles) from escaping from the sides of the device 100.

The gas diffusion induction chamber 114 and the gas recovery room 122 are formed by placing the device 100 on the liquid surface.

The drive device 104 is arranged above the float 102 and sits on a support device (124, 126) mounted on the float 102. A vertical output shaft 104a is provided with the drive device 104 that interconnects with the upper end of the rotary hollow shaft 106 by a coupling element 104b, which may pass through the coupling flange 118 and is hydraucally sealed with the coupling flange 118. The vertical output shaft 104a may be a solid motor shaft. The rotary hollow shaft 106 is drivable by the drive device 104 through the vertical output shaft 104a.

The support device used for supporting the drive device 104 may be a metallic support device and has an upper base 124 supported by at least three supports 126 mounted on top of the coupling flange 118. The drive device 104 is mounted on top of the upper base 124 of the support device supported by the at least three supports 126. The at least three supports 126 are high enough to eliminate combustion risk of electrical components with oxygen gas. For example, the at least three supports 126 are at least 5 inches high above the top portion 102a of the float 102 to separate the electrical components from the gas injection conduit 116.

The rotary hollow shaft 106 extends vertically and is partially immersed in the liquid. The rotary hollow shaft 106 has one or more gas suction apertures 128 on its sidewall above the liquid surface exposing to the gas diffusion induction chamber 114 for suction of oxygen gas from the gas diffusion induction chamber 114. The rotary hollow shaft 106 interconnects to the vertical output shaft 104a of the drive device 104 via the coupling element 104b coupling to the coupling flange 118. The gasket or hydraulic seal 120 is applied to the intercross section of the coupling element 104b and the coupling flange 118, which hydraulically seals the gas diffusion induction chamber 114 to prevent oxygen leakage from the gas diffusion induction chamber 114 to the environment. In addition, the gas injection conduit 116 is also hydraulically sealed with the coupling flange 118 (not shown). In this way, the gas diffusion induction chamber 114 is hydraulically sealed so that the injected oxygen gas from the gas injection conduit 116 does not escape to the top of the float 102, thereby avoiding the risk of combustion of the electric parts or electrical components (such as, the drive device 104 and power cables) on top of the float 102. Thus, the gas diffusion induction chamber 114 makes it feasible to have a pressurization capacity of greater than ambient pressure (e.g., 1 atm) while ensuring the integrity of the oxygen seal.

The impeller 108 is equipped at the lower end of the rotary hollow shaft 106 submerged in the liquid and may have three lobules. Thus, the impeller 108 is drivable by the rotary hollow shaft 106 and the drive device 104. The vertical gas jet hole 110 in the impeller 108 fluidly connected to a hollow 130 within the rotary hollow shaft 106 for injecting oxygen gas into the liquid. When the impeller 108 is driven to rotate, a vacuum is generated in the rotary hollow shaft 106, the vertical gas jet hole 110 and the liquid around the impeller 108. Upon the vacuum being generated, oxygen gas in the gas diffusion induction chamber 114 is sucked from the gas suction apertures 128 into the hollow 130 and the vertical gas jet hole 110 and then injected into the liquid, where the oxygen gas is dissolved and mixed with the liquid or wastewater. Here, the oxygen gas is sucked by the rotary hollow shaft 106 from a turbine drive produced by using the impeller 108 that may be a trilobular impeller. Some oxygen gas does not dissolve in the liquid and then rises up as bubbles of oxygen containing gas. The oxygen gas bubbles are collected in the gas recovery room 122 by the extended hood 102c to create a reservoir of recovered oxygen gas.

The oxygen gas delivered into the gas diffusion induction chamber 114 may be supplied from a cryogenic oxygen source. Thus, initially, without initiating the impeller 108, or without generating the vacuum, the gas diffusion induction chamber 114 may maintain a positive pressure. Although the oxygen gas in the gas diffusion induction chamber 114 initially has a positive pressure, the oxygen gas in the gas diffusion induction chamber 114 is sucked into the rotary hollow shaft 106 once the impeller starts. This results in the pressure in the gas diffusion induction chamber 114 becoming lower than that of the gas recovery room 122. As a result, the recovered oxygen gas collected in the gas recovery room 122 eventually flows back into the gas diffusion induction chamber 114 through gas recovery orifices 132 in the columnar structure 112 above the liquid surface and is continuously sucked into the hollow 130. In this way, the oxygen gas is recycled. The dimension of the vertical gas jet hole 110, the size and shape of the impeller 108, and the rotation speed of the impeller 108, are balanced to result in a desired rate of oxygen gas injection through the vertical gas jet hole 110 for mixing with the liquid. In a particular embodiment, the diameter of the vertical gas jet hole 110 of the impeller 108 is calculated to ensure the velocity of the oxygen gas or oxygen-rich gas passing through the impeller 108 ranges from 0.5 m/s to 5 m/s. Preferably, the velocity of the oxygen gas or oxygen-rich gas passing through the impeller 108 is about 2 m/s.

The gas injection conduit 116 is in an elbow shape and is placed in between the upper base 124 of the support device and the coupling flange 118. The gas injection conduit 116 passes through the coupling flange 118 into the gas diffusion induction chamber 114 for injecting oxygen gas into the gas diffusion induction chamber 114. The gas injection conduit 116 is hydraulically sealed (not shown) with the coupling flange 118, as the rotary hollow shaft 106 is, which prevents the leakage of oxygen to the environment. The gas injection conduit 116 consists of a mechanical tube made of material compatible with the medium (usually stainless steel). The part of the gas injection conduit 116 in the gas diffusion induction chamber 114 has a plurality of jet orifices (not shown) positioned at different heights and different directions within the gas diffusion induction chamber 114.

As described above, the gas diffusion induction chamber 114 may initially maintain a positive pressure. Once the impeller 108 is under operation and the vacuum is generated, the oxygen gas in the gas diffusion induction chamber 114 flows into the hollow 130 of the rotary hollow shaft 106, the vertical gas jet hole 110 of the impeller 108 and the body of the liquid. Subsequently, the oxygen gas mixes with the liquid and is dissolved. The undissolved oxygen gas flows back to the gas diffusion induction chamber 114 from the gas recovery room 122 through gas recovery orifices 132, forming an oxygen gas flow cycle for reuse of the recovered oxygen gas in the gas recovery room 122. In this way, less to no oxygen gas is wasted.

The columnar structure 112 is mounted to the bottom of the coupling flange 118, passes through the float opening 102b and extends to the liquid. The columnar structure 112 surrounds the rotary hollow shaft 106 and the gas injection conduit 116. The lower end of the columnar structure 112 is immersed in the liquid forming the gas diffusion induction chamber 114 with the coupling flange 118 and the liquid surface. A plurality of gas recovery orifices 132 are formed in the columnar structure 112 for receiving the recovered oxygen gas released from the liquid (bubbles), such that oxygen that are not fully dissolved in the liquid is reinjected. The gas diffusion induction chamber 114 has a hydraulic seal at the connections of the coupling flange 118 with the top portion 102a, the rotary hollow shaft 106, and the gas injection conduit 116, making it feasible to have a greater pressurization capacity while ensuring the integrity of the oxygen seal. The gas diffusion induction chamber 114 has the function of containing the oxygen gas within a hydraulically sealed space so that the injected oxygen does not leak to the top side of the float 102. Furthermore, the float 102 has the extended hood 102c extending into the liquid so that the released undissolved oxygen gas does not escape from the sides of the disclosed device. The oxygen gas or oxygen rich gas is fed through the gas injection conduit 116 from an oxygen source such as a gas tank or cryogenic reservoir (not shown). Thus, the gas diffusion induction chamber 114 maintains a pressure larger than ambient pressure (e.g., about 1 atm) at ambient temperature (e.g., about 25° C.) by feeding the oxygen gas or oxygen rich gas into it during operation of the disclosed device.

In one embodiment, the gas injection conduit 116 directs the flow of the oxygen gas in the same direction of rotation of the rotary hollow shaft 106 to maximize the oxygen suction and facilitate the mixing process with the liquid. In this embodiment, the oxygen gas is introduced into the gas diffusion induction chamber 114 through the gas injection conduit 116 by a tubular connection bended (e.g., an elbow shape) in the desired direction of the oxygen flow. In the gas diffusion induction chamber 114 the oxygen gas is distributed along the direction of the axis of insertion of the mixer (i.e., the axis of the rotary hollow shaft 106 and the impeller 108) and is aspirated for the diffusion process in net mass by the three-lobule impeller 108. When the drive device 104 (i.e., the motor) is turned on, the rotary hollow shaft 106 rotates with high rotation speed, propelling movement to the impeller 108 which in turn moves the liquid generating a negative pressure or a vacuum in the hollow 130 of the rotary hollow shaft 106, the vertical gas jet hole 110 of the impeller 108 and the liquid around the impeller 108. This negative pressure results in the suction of the oxygen gas from the gas diffusion induction chamber 114 to the liquid, mixing into the liquid as small bubbles, and dissolving into the liquid. The undissolved oxygen gas bubbles and rises up to the liquid surface due to buoyancy and gathers in the gas recovery room 122, since the extended hood 102c prevents the undissolved oxygen bubbles from escaping outside of the hood. Because the oxygen gas in the gas diffusion induction chamber 114 is sucked into the rotary hollow shaft 106 during operation, the pressure in the gas diffusion induction chamber 114 is getting lower than ambient pressure (e.g., 1 atm). Whereas, with the accumulation of the undissolved oxygen gas in the gas recovery room 122, the pressure of the gas recovery room 122 becomes higher than ambient pressure (e.g., 1 atm). Eventually the undissolved oxygen gas in the gas recovery room 122 flows into the gas diffusion induction chamber 114 through the gas recovery orifices 132 in the columnar structure 112. Thus, the undissolved oxygen gas is gathered in the gas diffusion induction chamber 114 for reuse.

Herein, the generated vacuum (or negative pressure) in the hollow 130, the vertical gas jet hole 110 and the liquid around the impeller 108 is the drive for the oxygen gas flowing from the gas diffusion induction chamber 114 to the rotary hollow shaft 106, the impeller 108 and the liquid, and the undissolved oxygen gas flowing from the liquid to the gas recovery room 122 and back to the gas diffusion induction chamber 114.

An oxygen gas or oxygen enriched gas (most often air) is generally used herein. One of ordinary skill in the art would recognize that the oxygen gas may be pure oxygen gas. The pure oxygen gas may be provided at greater than 95% v/v purity, for example, at greater than 99.99% v/v purity.

During operation, the rotation directions of the rotary hollow shaft 106 and the impeller 108 need to be aligned with the drive device 104, for example, an electric motor. The rotation direction of the shaft/impeller 106/108 should be the same, for example a "clockwise" direction. If not, the impeller 108 may unbalance the floating equipment and cause it to tip over. If this is the case, the axis of the impeller 108 needs to be remounted to make its rotation direction is the same as that of the rotary hollow shaft 106.

In case of shutdown of the drive device 104, that is, the impeller 108 are stopped to rotate, the oxygen supply from the gas injection conduit 116 should be immediately stopped. In addition, with the impeller 108 stopped to rotate, in order to avoid pushing the floating aerator device assembly, the gaseous oxygen supply pressure in the gas diffusion induction chamber 114 should not exceed a certain pressure, for example not exceed approximately 0.20 bar. In normal operation with the impeller 108 generating vacuum, a gradual increase of the oxygen supply pressure in the gas diffusion induction chamber 114 for measuring the efficiency in the oxygen diffusion and for mixing zone of influence of the net mass may be tested.

Figure 2:
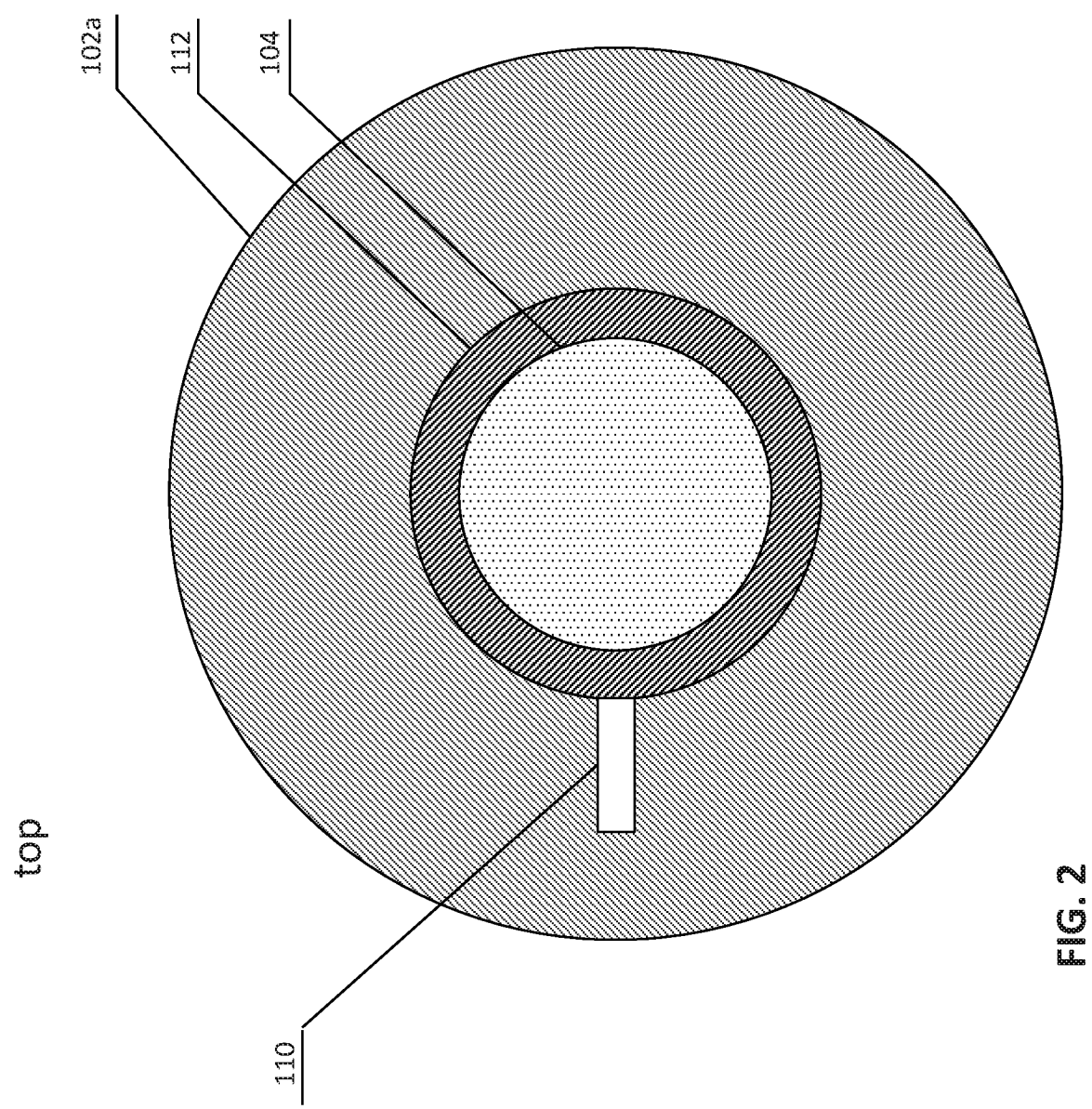
FIG. 2 is a schematic diagram of a top view of an embodiment of the disclosed floating aerator device.

FIG. 2 is a top view of the disclosed floating aerator device, showing the drive device 104, the coupling flange 118, the top portion 102a of the float 102 and the gas injection conduit 116.

Figure 3:
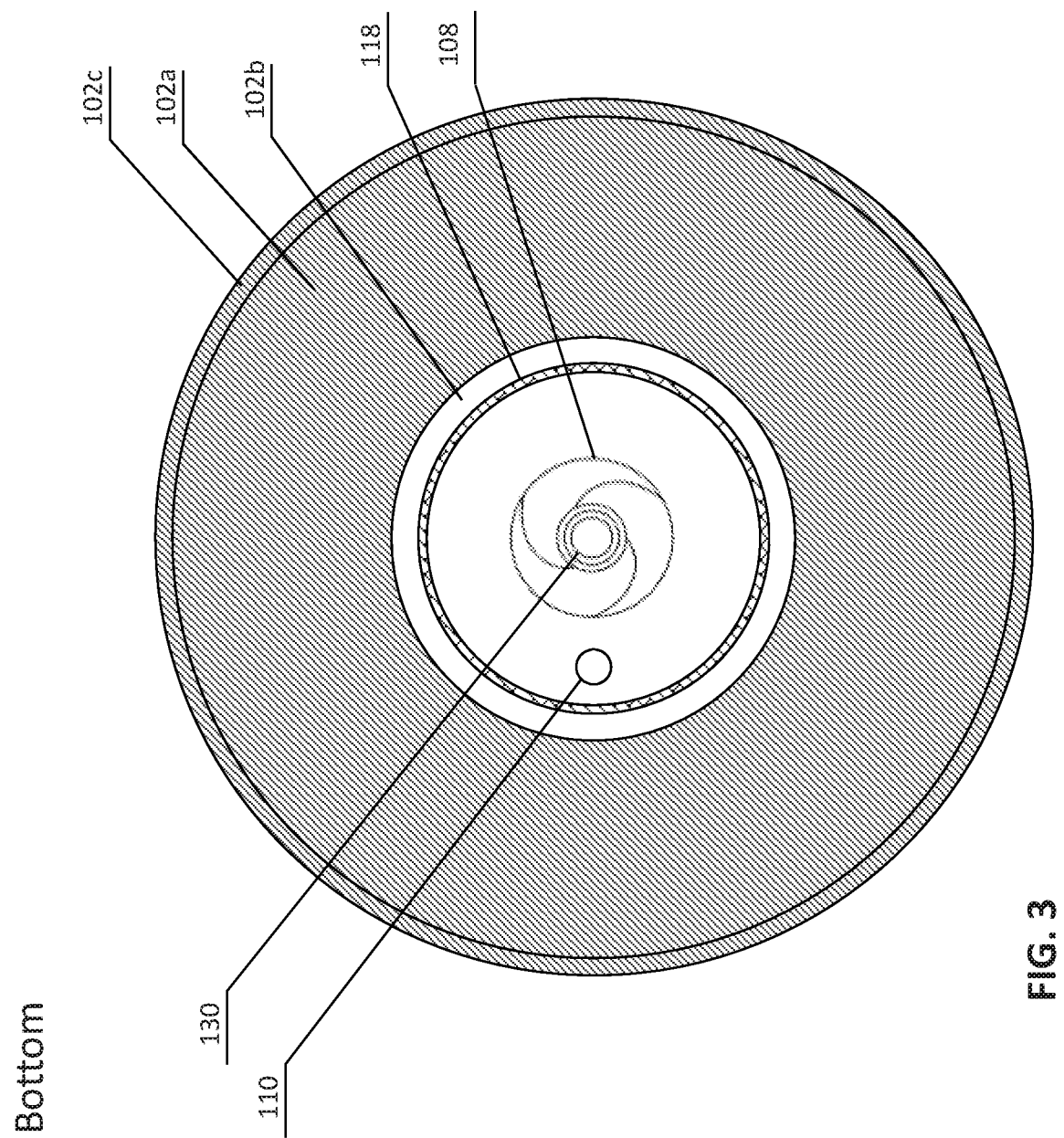
FIG. 3 is a schematic diagram of a bottom view of an embodiment of the disclosed floating aerator device.

FIG. 3 is a bottom view of the disclosed floating aerator device, showing the top portion 102a, the float opening 102b and the extended hood 102c of the float 102 the columnar structure 112, the impeller 108, the vertical gas jet hole 110 and the gas injection conduit 116.

Disclosed also include methods for injection of oxygen gas or oxygen-rich gas into a body of liquid or wastewater and recycling undissolved oxygen gas using the disclosed floating aerator device described above. The disclosed method includes the steps of disposing the floating aerator device 100 on the liquid surface to form a gas diffusion induction chamber 114 enclosed by the columnar structure 112, the float 102 and the liquid surface under the float 102; delivering the oxygen gas into the gas diffusion induction chamber 114 from the gas injection conduit 116; and driving the impeller 108 to rotate and generate a vacuum in the rotary hollow shaft 106, the vertical gas jet hole 110 and the body of the liquid around the impeller 108, wherein the oxygen gas in the gas diffusion induction chamber 114 is sucked into the body of the liquid through the gas suction apertures 128 of the rotary hollow shaft 106 and the vertical gas jet hole 110 in the impeller 108, wherein the oxygen gas is mixed with the liquid and the undissolved oxygen gas rises up due to buoyancy and is collected in the gas diffusion induction chamber 114 through gas recovery orifices 132 for reuse.

The disclosed device makes it possible to transfer a gas (e.g., oxygen gas) into a liquid efficiently and to ensure agitation whereby particles may be placed in suspension and held there. The disclosed device provides applications to the biological treatment of industrial effluents of wastewater.

The disclosed device has the advantages of enabling gas to be injected at atmospheric or slightly lower pressure, and of increasing the gas to liquid transfer efficiencies depending on the water height and the gas flow rate. The disclosed device makes it possible to apply a simple operation concept (similar to that of aerators using atmospheric air) with the use of pure oxygen and recycling undissolved oxygen, solving mainly the problem of space in existing stations, as it considerably increases the energetic efficiency of the aerator and reducing the time of treatment. Furthermore, with the use of oxygen gas or oxygen-rich gas, there is an increase in performance by reducing the area required for treatment comparing to the aerator using air. The disclosed device also solves material compatibility problems with the use of pure oxygen, which poses a safety risk for atmospheric aerator designs. Since the disclosed device floats on the liquid surface for injection of oxygen gas or oxygen-rich gas, all materials used in the disclosed device were designed to be fully compatible with the use of oxygen, which reduces the risk of combustion of the materials traditionally employed for air injectors or aerators.

With the disclosed floating aerator device, the following advantages have been achieved.

Oxygen diffusion induction chamber with hydraulic seal makes it feasible to have a greater pressurization capacity while ensuring the integrity of the oxygen seal;

Rotary hollow shaft with an impeller has high durability at high working temperatures and extreme friction conditions;

Oxygen introducing tube directs the oxygen flow in the same direction of rotation of the rotary hollow shaft to maximize the oxygen suction and facilitate the mixing process with the liquid;

Extension of the support device ensures the safety spacing between the oxygen chamber and the electrical and hot risk generating parts of the equipment.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The singular forms "a", "an" and "the" include plural referents, unless the context clearly dictates otherwise.

"About" or "around" or "approximately" in the text or in a claim means ±10% of the value stated.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Ranges may be expressed herein as from about one particular value, and/or to about another particular value. When such a range is expressed, it is to be understood that another embodiment is from the one particular value and/or to the other particular value, along with all combinations within said range.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

We claim:

1. A device for injection of oxygen gas or oxygen-rich gas into a body of liquid or wastewater, the device comprising:
    a rotary hollow shaft vertically passing through a float partially immersed in the liquid, the rotary hollow shaft having at least one gas suction aperture disposed at an upper portion of the rotary hollow shaft above a liquid surface;
    an impeller attached to a lower end of the rotary hollow shaft, drivable by the rotary hollow shaft and immersed in the liquid, the impeller having a vertical gas jet hole fluidly connected to a hollow of the rotary hollow shaft;

a columnar structure, surrounding the rotary hollow shaft, mounted on the bottom side of the float and vertically extending into the liquid;

a gas diffusion induction chamber formed by the columnar structure, the float and the liquid surface under the float; and a gas injection conduit passing through the float for delivering the oxygen gas into the gas diffusion induction chamber, wherein the device is adapted and configured to generate a vacuum in the body of the liquid around the impeller when the impeller is driven to rotate, so that the oxygen gas in the gas diffusion induction chamber is sucked into the hollow of the rotary hollow shaft via the gas suction aperture and into the body of the liquid via the vertical gas jet hole, where the oxygen gas is mixed with the liquid and undissolved oxygen gas rises up and is returned to the gas diffusion induction chamber for reuse.

2. The device of claim 1, wherein the at least one gas suction apertures of the rotary hollow shaft exposes to the gas diffusion induction chamber for suction of the oxygen gas from the gas diffusion induction chamber to the rotary hollow shaft.

3. The device of claim 1, wherein the columnar structure has a plurality of gas recovery orifices above the liquid surface for collection of the undissolved oxygen gas returned to the gas diffusion induction chamber for reuse.

4. The device of claim 1, wherein the rotary hollow shaft and the gas inlet each pass through the float through a hydraulically sealed opening in the float.

5. The device of claim 1, further comprising a drive device provided with a vertical output shaft connected to an upper end of the rotary hollow shaft, the drive device configured and adapted to drive the rotary hollow shaft.

6. The device of claim 5, wherein the drive device sits on a support device above the float, wherein the support device is at least 5 inches above the float to reduce the combustion risk of electrical components with the oxygen gas.

7. The device of claim 1, wherein an extended hood is connected to an outer rim of the float extending into the liquid for capturing the undissolved oxygen gas.

8. The device of claim 7, wherein the length of the extended hood immersed in the liquid is approximately the same as that of the rotary hollow shaft immersed in the liquid.

9. The device of claim 1, further comprising a recovery room surrounding the gas diffusion induction chamber, the recovery room formed by the float, the columnar structure and the liquid surface.

10. A method for injection of oxygen gas or oxygen-rich gas into a body of liquid or wastewater using a floating oxygenator, the floating oxygenator including: a rotary hollow shaft vertically passing through a float, partially immersed in the liquid; an impeller attached to a lower end of the rotary hollow shaft, drivable by the rotary hollow shaft and immersed in the liquid, the impeller having a gas injection hole fluidly connected to a hollow of the rotary hollow shaft; a columnar structure, surrounding the rotary hollow shaft, mounted on a bottom side of the float and vertically extending into the liquid; a gas diffusion induction chamber formed by the columnar structure, the float and the liquid surface under the float; and a gas inlet passing through the float surrounded by the columnar structure for delivering an oxygen containing gas, the method comprising the steps of:

disposing the floating oxygenator on a surface of the liquid (i) to form a gas diffusion induction chamber enclosed by the columnar structure, the float and the liquid surface under the float and (ii) to immerse the impeller into a body of the liquid;

delivering the oxygen gas into the gas diffusion induction chamber from the gas inlet; and driving the impeller to rotate and generate a vacuum in the body of the liquid around the impeller, wherein the oxygen gas in the gas diffusion induction chamber is sucked into the body of the liquid through the hollow of the rotary hollow shaft and the gas injection hole of the impeller, where the oxygen gas is mixed and reacted with the liquid and undissolved oxygen gas rises up and is collected in the gas diffusion induction chamber for reuse.

11. The method of claim 10, wherein the step of driving the impeller to rotate comprises initiating a drive device to start, wherein a solid shaft at the bottom of the drive device connected to an upper end of the rotary hollow shaft drives the impeller to rotate.

12. The method of claim 11, wherein the drive device is disposed above the float for at least 5 inches high to avoid contact of oxygen gas or oxygen-rich gas with electrical components.

13. The method of claim 10, wherein the columnar structure has a plurality of gas recovery orifices above the liquid surface for collection of the undissolved oxygen gas.

14. The method of claim 10, wherein the sidewall of the rotary hollow shaft has at least one gas suction aperture exposed to the gas diffusion induction chamber for suction of the oxygen gas.

15. The method of claim 10, wherein an extended hood is connected to an outer rim of the float extending into the liquid body for capturing the undissolved oxygen gas.

16. The method of claim 15, wherein a length of the extended hood extending into the liquid body is 80-120% of a length of the rotary hollow shaft immersed into the liquid body.

17. The method of claim 10, wherein the rotary hollow shaft and the gas inlet pass through the top portion of the float through a hydraulically sealed opening in the float.

18. The method of claim 10, wherein the oxygen gas in the gas diffusion induction chamber has a positive pressure.

19. The method of claim 10, wherein the velocity of the oxygen gas inside the impeller ranges from 0.5 m/s to 5 m/s.

20. The method of claim 10, wherein the velocity of the oxygen gas inside the impeller is about 2 m/s.

* * * * *